US012325117B2

(12) United States Patent
Lombardo

(10) Patent No.: US 12,325,117 B2
(45) Date of Patent: *Jun. 10, 2025

(54) HINGE MORTISING TOOL

(71) Applicant: Mace Lombardo, Los Angeles, CA (US)

(72) Inventor: Mace Lombardo, Los Angeles, CA (US)

(73) Assignee: Mace Lombardo, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,638

(22) Filed: Apr. 12, 2024

(65) Prior Publication Data

US 2024/0308044 A1 Sep. 19, 2024

Related U.S. Application Data

(63) Continuation of application No. 17/839,365, filed on Jun. 13, 2022, now Pat. No. 11,981,014, which is a continuation of application No. 16/847,214, filed on Apr. 13, 2020, now Pat. No. 11,383,367, which is a continuation of application No. 15/658,340, filed on Jul. 24, 2017, now Pat. No. 10,661,420.

(51) Int. Cl.
*B25D 3/00* (2006.01)
*B27F 5/00* (2006.01)

(52) U.S. Cl.
CPC .................. *B25D 3/00* (2013.01); *B27F 5/00* (2013.01); *B25D 2222/75* (2013.01)

(58) Field of Classification Search
CPC .... B27C 1/002; B27F 1/08; B27F 1/12; B27F 1/14; B27F 5/00; B27F 5/026; B27F 5/10; B27F 5/125; B25D 3/00
See application file for complete search history.

(56) References Cited

U.S. PATENT DOCUMENTS

| | | | |
|---|---|---|---|
| 770,261 | A | 9/1904 | Carson |
| 1,430,847 | A | 10/1922 | Anderson |
| 2,500,800 | A | 3/1950 | Carlson |
| 2,875,656 | A | 3/1959 | Wynne, Jr. |
| 3,850,211 | A | 11/1974 | Garnier |
| 4,235,268 | A | 11/1980 | Savary |
| 4,984,613 | A | 1/1991 | Szeto et al. |

(Continued)

OTHER PUBLICATIONS

PCT International Search Report (ISR), PCT/US2018/043233, filed Jul. 23, 2018, dated Oct. 29, 2018, 3 pages.

(Continued)

*Primary Examiner* — Matthew Katcoff
(74) *Attorney, Agent, or Firm* — POLSINELLI LLP

(57) ABSTRACT

A mortising kit for hinges, locks, strike plates, and the like can include a guide attachable to a subject to be mortised (e.g., door or door jamb). The kit can include a chisel that interacts with locating features of the guide to ensure proper placement of the chisel. Force applied to the chisel can score or otherwise cut the subject to a desired depth, at which point stops or other features of the guide can limit the chisel from scoring or cutting deeper. Placement of the chisel at opposite ends of the guide allow the full mortise perimeter to be scored or cut. Excess waste material can be removed from between the mortise perimeter, such as through use of the block plane.

17 Claims, 13 Drawing Sheets

(56) References Cited

U.S. PATENT DOCUMENTS

| | | | | |
|---|---|---|---|---|
| 5,511,312 | A | 4/1996 | Hobbs | |
| 7,241,091 | B1 * | 7/2007 | Yang | E05D 11/0009 33/562 |
| 2004/0031541 | A1 * | 2/2004 | Gomez | B27F 5/10 144/27 |
| 2008/0263875 | A1 | 10/2008 | Barry | |

OTHER PUBLICATIONS

Non-final Office Action dated Jul. 11, 2019, U.S. Appl. No. 15/658,340, filed Jul. 24, 2017, 12 pages.
Notice of Allowance dated Jan. 23, 2020, U.S. Appl. No. 15/658,340, filed Jul. 24, 2017, 8 pages.
Written Opinion of the International Searching Authority, dated Oct. 29, 2018, PCT/US2018/043233, filed Jul. 23, 2018, 12 pages.
Notice of Allowance dated Mar. 16, 2022, U.S. Appl. No. 16/847,214, filed Apr. 13, 2020, 15 pages.
Non-final Office Action dated Oct. 23, 2023, U.S. Appl. No. 17/839,365, filed Jun. 13, 2022, 16 pages.

* cited by examiner

HINGE MORTISING TOOL

CROSS-REFERENCES TO RELATED APPLICATIONS

This application is a continuation of U.S. patent application Ser. No. 17/839,365 filed Jun. 13, 2022, which is a continuation application of U.S. patent application Ser. No. 16/847,214 filed Apr. 13, 2020, now U.S. Pat. No. 11,383,367, which is a continuation of Ser. No. 15/658,340, filed on Jul. 24, 2017, now U.S. Pat. No. 10,661,420 and is related to PCT Application No. PCT/US18/43233 filed on Jul. 23, 2018, both of which are incorporated herein by reference in their entirety for all purposes.

TECHNICAL FIELD

The present disclosure relates to woodworking generally and more specifically to preparing mortises for hinges and other hardware.

BACKGROUND

Many traditional hinges are installed in a mortise or cutout so that the hinge may be installed flush with the subject material, such as the door or the door jamb. This flush relationship can be important to ensuring proper functionality of the hinge, maintaining the integrity of the hinge, and maintaining a desirable visual appearance. For example, many doors and doorframes can be prepared with several mortises into which hinges may be installed. The creation of these mortises can be a difficult and time-consuming task to do properly. Additionally, since hinges exist in many different shapes and sizes, one must ensure the mortise is cut to the proper size for the desired hinge.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
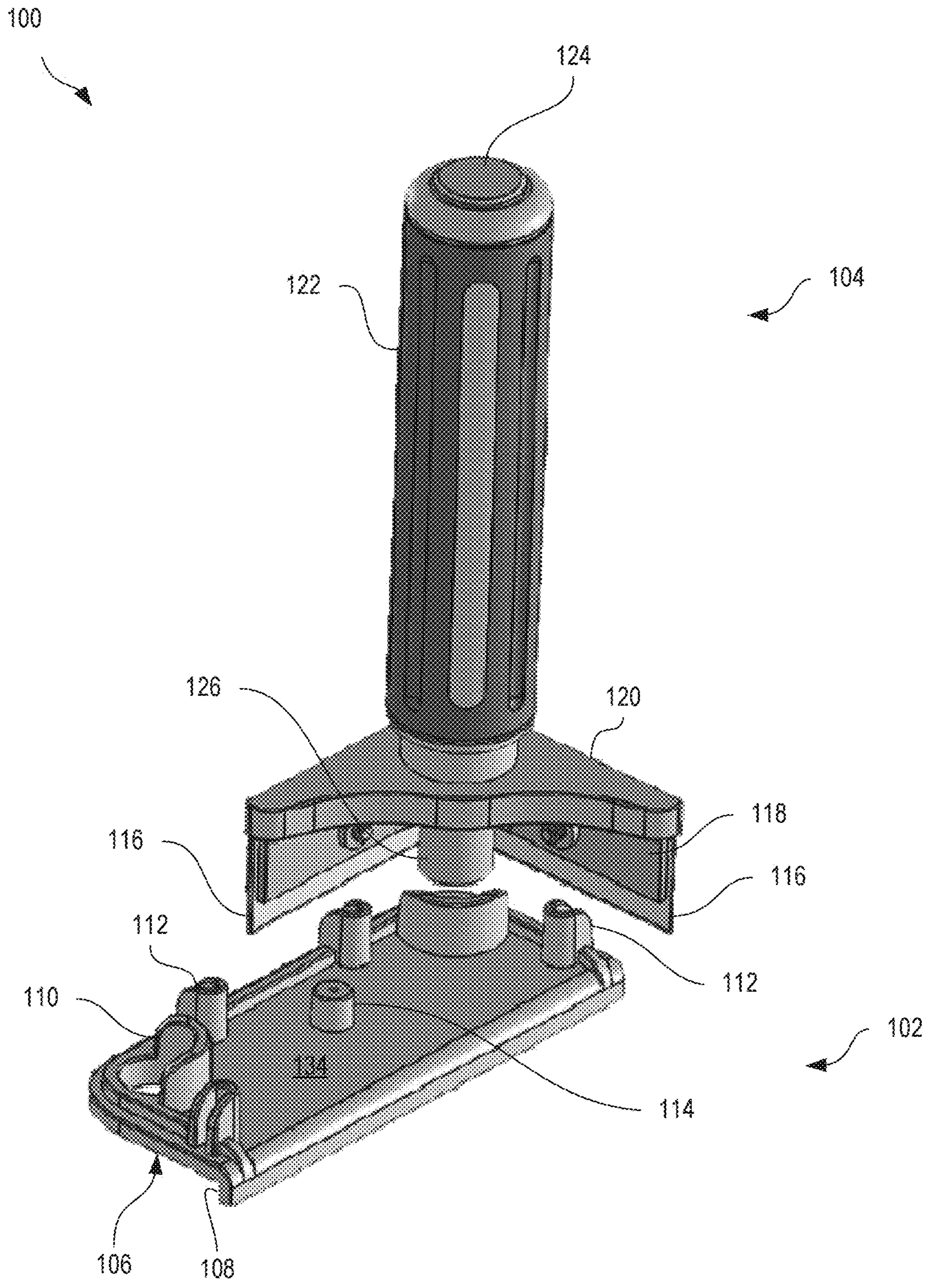
FIG. 1 is an axonometric diagram depicting a mortising kit according to certain aspects of the present disclosure.

Certain aspects and features of the present disclosure relate to a mortising tool suitable for creating mortises for hinges and other similar hardware, such as locks, strike plates, and the like. The mortising kit can include a guide suitable for removable attachment to the subject to be mortised, such as a door or a door jamb. A chisel can interact with locating features of the guide to ensure proper placement of the chisel. Force applied to the chisel can score or otherwise cut the subject to a suitable depth. Stops or other features of the guide can limit the chisel from scoring or cutting too deeply within the subject. Placement of the chisel at opposite ends of the guide can allow for scoring or cutting of the full mortise perimeter. The guide can be removed and the excess waste material can be removed from between the mortise perimeter, such as through use of a block plane.

The guide of the mortising kit can be a tool that provides a pattern for the final mortise. The guide can be made of any suitable material, such as metal or plastic. The guide can be removably attached to a subject to be mortised, such as a door or door jamb, although other subjects may be used. The guide may be removably attached using pressure, adhesives, magnets, or otherwise. In some cases, the guide is removably secured to the subject by protrusions designed to protrude into the subject. These protrusions can be tacks, nails, or other similar protrusions. In some cases, the protrusions can be monolithic and/or built into the guide itself. In some cases, these protrusions can be separable from the guide, such as a tack secured through a hole or aperture in the guide and into the subject. In some cases, the protrusions can be located to align with the future locations of hinge screws. Therefore, the protrusions can act to create pilot holes at locations where screws would later be used to install the hinge. In some cases, one or more protrusions can also mark locations in the subject material where other holes may need to be drilled, such as a location where a hole may be separately drilled into the subject material to allow insertion of a latch assembly, a latch, a bolt assembly, or a bolt of a door lock.

The guide of the mortising kit can include one or more locator features. The locator features can interact with the chisel to ensure repeatable, proper placement of the chisel. A locator feature can include mechanical, electrical, magnetic, or other techniques for ensuring proper placement of the chisel. In some cases, a locator feature can include an aperture for receiving a protrusion of the chisel. Such a locator feature that is an aperture can include a sidewall for interacting with a sidewall of the protrusion of the chisel. In some cases, the locator feature of the guide can be a protrusion designed to locate within an aperture of the chisel. In some cases, other mechanical features can be used as locator features. In some cases, a locator feature is used in addition to placement of the blade(s) of the chisel against edges of the guide. In some cases, the locator feature allows for proper placement of the chisel without requiring the blade(s) of the chisel to rest against any edges of the guide. In some cases, a locator feature can include magnets designed to urge the chisel into proper placement with respect to the guide. In some cases, electrical or optical feedback can be used to indicate when the chisel is in proper or improper placement with respect to the guide. In some cases, the chisel includes a locator feature that interacts with the locator feature of the guide. In some cases, the locator feature of the chisel can be similar to and complementary to any of the locator features of the guide. For example, a locator feature of the chisel can be a protrusion, an aperture, a magnetic feature, or any other suitable feature.

One or more stops can be included between the guide and the chisel to keep the chisel from cutting into the subject material too deeply. For example, the guide can include one or more stops designed to interact with a shoulder or other feature of the chisel. Force applied to the chisel can initially cut into the subject material. After cutting to the desired depth, the shoulder or other feature of the chisel can interact with the one or more stops of the guide, thus dissipating any additional applied force throughout the surface area of the guide instead of concentrating the additional applied force to the cutting blades of the chisel. Therefore, after cutting to the desired depth, additional force applied to the chisel may be dissipated instead of cutting further into the subject material. The one or more stops can be formed monolithically into the guide, can be coupled to the guide, or can be placed between the guide and the chisel during use (e.g., the stop can be a thick plate of metal, plastic, or hard rubber). In some cases, the stops can be adjustable or can be selected to allow chiseling to whatever depth is desired. For example, a stop can be adjusted or one or more stops or stop attachments can be selected to provide a shallower or deeper cutting depth than otherwise available. In some cases, a locator feature can include one or more stops. In some cases, a stop can include a locator feature. In some cases, the one or more stops can be included as part of the chisel.

The mortising kit can include a chisel. The chisel can be a corner chisel. The chisel can be a right angle chisel, able to score or make a cut having edges that are at or approximately at 90° to one another or within at or approximately 1°, 2°, 3°, 4°, 5°, 6°, 7°, 8°, 9°, 10° of one another. In some cases, the chisel can produce a scoring or cut having a fillet or chamfer at its corner. The fillet or chamfer can be of any suitable or desirable size. The fillet or chamfer can be selected to coordinate with a desired hinge, such as a hinge having a ⅝ inch radius. In some cases, no fillet or chamfer may be used. In some cases, a minimal chamfer may be used, even with hinges having square edges.

The chisel can include a handle, one or more shoulders, and one or more blades. The handle can include an impact receiving end which may be flattened, widened, or otherwise suitable for receiving and concentrating force, such as from a hammer blow. The chisel can concentrate the impact force into the one or more shoulders and into the one or more blades. Therefore, up to a certain depth, impact force received at the handle can drive the blade(s) into the subject material. However, once a desired depth is reached, the interaction between the one or more shoulders and the one or more stops will cause the impact force to dissipate throughout the guide body and will stop the blade(s) from driving deeper than desired.

In some cases, chisels can include one or more removable or replaceable blades. For example, a chisel can include one or more blade holders for holding one or more blades. For example, a blade holder can include opposing walls capable of grasping a blade and securing the blade in place through friction induced by tightening a fastener, such as a bolt. Other blade holders can be used. The one or more blade holders can be coupled to the one or more shoulders or can be otherwise included in or coupled to the body of the chisel. When replaceable blades are used, the chisel may be accompanied by a kit containing multiple blade shapes. For example, a kit may include at least two of a blade having a fillet at its corner, a blade having a chamfer at its corner, and a blade having a 90° corner without a fillet or chamfer. In some cases, the kit may include at least two of a blade having a ⅝ inch fillet at its corner, a blade having a ¼ inch fillet at its corner, a blade having a 90° corner, and a blade having a chamfer at its corner. When a user prepares to use the chisel, the user can select the blade best-matching the hinge shape, secure the blade into the chisel, and use the chisel as described in further detail herein to prepare a mortise for the hinge. When the same user desires to use the chisel with a differently shaped hinge, the user can remove the first blade from the chisel, select a different blade from the kit, secure that new blade to the chisel, and use the chisel as described in further detail herein to prepare a mortise for the differently shaped hinge.

In some cases, a chisel can include one or more permanent, or non-replaceable, blades. A permanent blade can include a blade secured to the chisel in a manner not designed for user replacement (e.g., secured with strong adhesive or welding) or can include a blade that is monolithically formed as part of the chisel. In such cases, the one or more blades may be sharpenable to prolong life of the chisel. In some cases, a kit can include multiple permanent-blade chisels. For example, a kit may include at least two permanent-blade chisels of a permanent-blade chisel having a blade with a fillet at its corner, a permanent-blade chisel having a blade with a chamfer at its corner, and a permanent-blade chisel having a blade with a 90° corner without a fillet or chamfer. In some cases, the kit can include at least two chisels selected to provide at least two blades with ⅝ inch fillets, ¼ inch fillets, 90° corners, or chamfered corners.

In some cases, each chisel can include a single blade bent or formed into the desired shape (e.g., a 90° shape with or without a fillet or chamfer). However, that need not be the case. In some cases, a chisel can include two or more blades arranged to produce the desired shape (e.g., two straight blades arranged at a 90° angle). Any instance of a single blade as described herein may be replaced by multiple blades, as appropriate.

In some cases, the locator features of the chisel and/or guide can be angled to allow the blade to cut into the substrate material at an angle other than perpendicular to the top or bottom surface of the guide (e.g., perpendicular to the surface of the substrate material). An angled or beveled cut can therefore be made.

In some cases, a guide can include multiple sets of locator features. Each set of locator features can be associated with a particular size mortise perimeter. For example, use of a chisel as disclosed herein with a first set of locator features may facilitate cutting a 3" long mortise, whereas use of the chisel with a second set of locator features may facilitate cutting a 4" long mortise. In some cases, a user can use the same chisel with different guides to achieve different mortise perimeter sizes. In some cases, a user can use the same guide with different chisels to achieve different mortise perimeter sizes.

Various embodiments are described herein that relate to a mortise being cut into a subject material wherein the mortise extends to an edge of the material. In some cases, however, a mortising kit can include a guide (e.g., without a lip) and a chisel that can be used to cut a mortise that is spaced apart from any edge of the subject material.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale and certain dimensions may be exaggerated for illustrative purposes.

FIG. 1 is an axonometric diagram depicting a mortising kit 100 according to certain aspects of the present disclosure. The mortising kit 100 can include a guide 102 and a chisel 104. The guide 102 can be placed on a subject material to be mortised at a desired location and the chisel 104 can be used in conjunction with the guide to ensure proper alignment when the chisel 104 is impacted to cut out a mortise perimeter.

The guide 102 can include a bottom surface 106 for placement on a surface to be mortised, such as a side surface of a door or door jamb. In some cases, the guide 102 can include a lip 108 that can be placed against a front surface of the material to be mortised. The lip 108 can ensure proper placement of the guide 102 such that the resultant mortise extends a suitable and/or sufficient distance onto the surface.

The terms "front" and "side" are used herein with reference to a subject material to be mortised, and may be used with respect to the subject material itself (e.g., a door) and not necessarily with respect to the mortise. For example, a front surface may refer to a surface visible from in front of a door or behind a door when the door is closed, whereas a side surface may refer to a surface having a width that is the thickness of the door, such a side surface only being visible when the door is opened. Since hinges and other such features are commonly attached to a side of a door, a mortise for such a hinge may show its length and width in a "side" view and may show its thickness in a "front" view as those terms are used herein. These terms or orientation are used only for convenience and are not intended to limit the disclosure.

The guide 102 can include one or more securement features 114 designed to facilitate securing the guide 102 to the subject material. In some cases, a securement feature 114 may be present only on or at a bottom surface 106 of the guide 102. For example, a securement feature 114 can be a protrusion or other mechanical features designed to press into the subject material. In some cases, as depicted in FIG. 1, a securement feature 114 can extend through the guide 102 and/or be present on the upper surface 134 of the guide 102. As depicted in FIG. 1, the securement feature 114 is a raised portion including a central aperture for receiving a fastener, such as a nail, screw, tack, or other such fastener. The fastener can be placed through the central aperture of the securement feature 114 to engage the subject material underneath the guide 102.

In some cases, the one or more securement features 114 are located at hinge fastener locations. Hinge fastener locations can be the location where fasteners (e.g., screws) would be used to secure the hinge to the subject material when the hinge is placed in the mortise formed by the mortising kit 100. Thus, any marks, indentations, or other remaining effects of the securement feature 114 on the subject material can be used to help locate or even prepare pilot holes for hinge fasteners (e.g., screws).

The guide 102 can include one or more guide locator features 110. A guide locator feature 110 can be designed to interact with a chisel locator feature 126. The guide locator feature 110 and chisel locator feature 126 can be of any suitable shape, size, or type. For example, as depicted in FIG. 1, the guide locator feature 110 can include a hole or aperture into which a chisel locator feature 126 that is a protrusion or peg can be placed or inserted. A guide locator feature 110 and a chisel locator feature 126 can be designed to slidably mate together, allowing the chisel 104 to move perpendicularly to the guide 102 (e.g., perpendicularly to a bottom surface 106 of the guide 102) while restricting the chisel 104 from moving in other fashions (e.g., translating parallel to the guide 102, such as translating within a plane parallel to a bottom surface 106 of the guide 102).

In some cases, a guide locator feature 110 can be shaped to limit rotational movement of the chisel locator feature 126 therein, such as to maintain a constant or desired position of the chisel 104 within the guide 102 that would position the blades 116 of the chisel 104 in a desired orientation with respect to the guide 102. For example, a guide locator feature 110 can include an eccentric shape (e.g. square or oval) and/or can include a keyed portion that interacts with a compatible portion of the chisel locator feature 126 to limit rotational movement of the chisel 104 with respect to the guide locator feature 110. In some cases, such as if a guide 102 includes only a single guide locator feature 110, a guide locator feature 110 can be designed to accept the chisel locator feature 126 in two or more orientations, each orientation corresponding to positioning of the blade 116 of the chisel 104 at different locations with respect to the guide 102.

In some cases, interaction between a guide locator feature 110 and a chisel locator feature 126 can maintain the one or more blades 116 of the chisel 104 in a perpendicular orientation with the surface of the subject material (e.g., a perpendicular orientation with a bottom surface 106 and/or top surface 134 of the guide 102).

In some cases, a guide 102 can include at least two guide locator features 110, each capable of interacting with (e.g., receiving) the chisel locator feature 126 and each corresponding to a unique orientation of the chisel 104 when the chisel locator feature 126 interacts with the respective guide locator feature 110. For example, when the chisel locator feature 126 interacts with a first guide locator feature 110, force applied to the chisel 104 can cause the blade 116 of the chisel to cut a first portion of a mortise perimeter, and when the chisel locator feature 126 interacts with a second guide locator feature 110, force applied to the chisel 104 can cause the blade 116 of the chisel to cut a second portion of a mortise perimeter. In some cases, the first portion of the mortise perimeter and second portion of the mortise perimeter can establish the full mortise perimeter. In some cases, the first portion and second portion can intersect and/or overlap, although that need not be the case.

The guide locator feature 110 can be specifically positioned on the guide 102 such that when the chisel locator feature 126 interacts with the guide locator feature 110, the one or more blades 116 of the chisel 104 will be in a desired position with respect to the guide 102 (e.g., with respect to the bottom surface 106 and/or lip 108 of the guide 102). For example, the guide locator feature 110 can be located at a desired distance from the lip 108 and at a desired distance from the center of the guide 102 to ensure proper placement of the blade(s) 116 of the chisel 104 during use.

The chisel 104 can include a chisel handle 122 supporting one or more blades 116. A chisel locator feature 126 can be permanently or removably coupled to the chisel 104. The chisel locator feature 126 can be specifically positioned in relation to the one or more blades 116 such that when the chisel locator feature 126 interacts with the guide locator feature 110, the one or more blades 116 will be in a desired position with respect to the guide 102 (e.g., with respect to the bottom surface 106 and/or lip 108 of the guide 102).

The chisel 104 can include a handle end 124 for receiving force, such as from a hammer or other source of force. Force received at the handle end 124 can be transmitted through the chisel 104 and into the one or more blades 116 to cut into a subject material. The one or more blades 116 can be secured onto the chisel 104 using one or more blade holders 118, although that need not be the case, such as if the blade(s) 116 are formed monolithically with all or some other parts of the chisel 104.

The chisel 104 can include one or more shoulders 120 that can interact with one or more stops 112 of the guide 102 to limit travel of the one or more blades 116 into the subject material past a desired depth (e.g., to limit travel of the one or more blades 116 no more than a desired distance past the bottom surface 106 of the guide 102). In some cases, the one or more stops 112 and/or one or more shoulders 120 can be adjustable to set the desired depth or desired distance of travel of the one or more blades 116 of the chisel 104. In some cases, a guide locator feature 110 can act as or include a stop 112. In some cases, a chisel locator feature 126 can act as or include a shoulder 120. In some cases, an upper surface 134 of the guide 102 can act as a stop.

As depicted in FIG. 1, the guide locator features 110 are holes extending through the guide 102, however that need not be the case. In some cases, a guide locator feature that includes a hole or aperture at some cross section of the guide 102 can extend for a distance less than through the entire thickness of the guide 102, thus forming a recess with an exposed surface. In some cases, a distal end of a chisel locator feature 126 (e.g., lower end, as depicted in FIG. 1) can interact with an exposed surface of a recess of a guide locator feature to limit travel of the chisel 104 beyond a desired depth. In such cases, the guide locator feature 110 can act as a stop 112 without necessarily extending above an upper surface 134 of the guide 102.

As depicted in FIG. 1, four stops 112 extend from the upper surface 134. Force applied to the chisel 104 in a cutting direction (e.g., downwards as seen in FIG. 1) can cause the chisel 104 to cut into the subject material until a desired depth is reached, at which point the distal ends of the stops 112 (e.g., ends nearest the chisel) can interact with the shoulder 120 to limit further travel of the chisel 104 in the cutting direction. Any additional force applied to the chisel 104 at that time can be dissipated through the shoulder 120, through the stops 112, and into the guide 102, which may further dissipate that force into the subject material against which the guide 102 has been placed.

Any number of stops 112 can be used and the stop(s) 112 can be of any suitable shape or size. In some cases, the stops 112 of the guide 102 can interact with the shoulder 120 of the chisel 104 at one or more locations. In some cases, the stops 112 of the guide 102 can interact with the shoulder 120 of the chisel 104 at all locations simultaneously. In some cases, interaction between a guide locator feature 110 and a chisel locator feature 126 can maintain the shoulder 120 of the chisel 104 in a parallel orientation with the bottom surface 106 of the guide 102, the top surface 134 of the guide 102, and/or the distal ends of the one or more stops 112 of the guide 102.

In some cases, the guide 102, including any guide locator features 110, securement features 114, and/or stops 112 can be monolithically formed of a single piece of material (e.g., plastic, rubber, metal, or any other suitable material) or can be formed in multiple pieces. In some cases, a guide 102 can include an existing piece of equipment to which a guide locator feature 110 is attached (e.g., using adhesives, magnets, or otherwise). For example, in some cases, a guide 102 can be a hinge to which a guide locator feature 110 is removably attached.

In some cases, the chisel 124, including any chisel locator features 126, blades 116, blade holders 118, and/or shoulders 120 can be monolithically formed of a single piece of material (e.g., plastic, rubber, metal, or any other suitable material) or can be formed in multiple pieces. In some cases, a chisel 104 can include an existing piece of equipment to which a chisel locator feature 126 is attached (e.g., using adhesives, magnets, or otherwise). For example, in some cases, a chisel 104 can be an existing corner chisel 104 to which a chisel locator feature 110 (and/or a shoulder 120) is permanently or removably attached.

Figure 2:
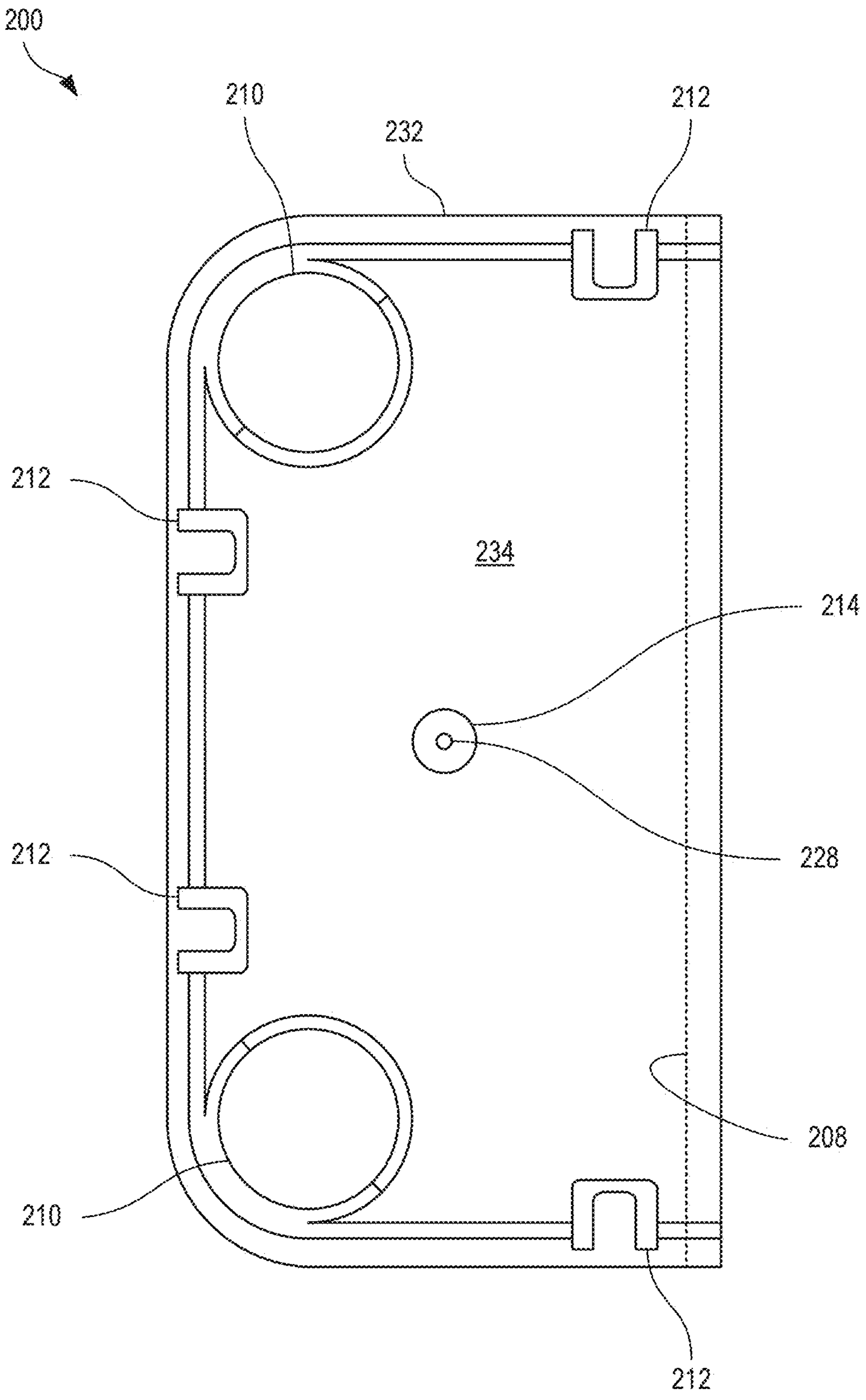
FIG. 2 is a top view of a guide of a mortising kit according to certain aspects of the present disclosure.

FIG. 2 is a top view of a guide 200 of a mortising kit according to certain aspects of the present disclosure. The guide 200 can be guide 102 of FIG. 1. Guide 200 can include a perimeter 232 having one or more sides. The top surface 234 can be seen, which is located opposite a bottom surface that would be placed in contact with a subject material to be mortised. The guide 200 may be slid against the subject material until lip 208 engages another surface of the subject material (e.g., a front or back of a door).

Guide 200 can include two guide locator features 210, although any other number of guide locator features 210 can be used. The guide 200 can also include four stops 212, although any other number of stops 212 can be used. The guide locator features 210 can be spaced a distance 130 from the lip 208, such that the guide locator features 210 are in known positions with respect to the subject material to be mortised (e.g., with respect to a front or back surface of the subject material) when the guide 200 is positioned on the subject material (e.g., when the lip 208 is positioned against a front or back of the subject material).

In some cases, guide 200 can include a securement feature 214, although any number of securement features 214 can be used. In some cases, a securement feature 214 can include an aperture 228 into which a fastener, such as a nail, screw, tack, or other such fastener, can be placed. The fastener can be placed through the aperture 228 of the securement feature 214 to engage the subject material underneath the guide 202, thus securing the guide 202 to the subject material.

Figure 3:
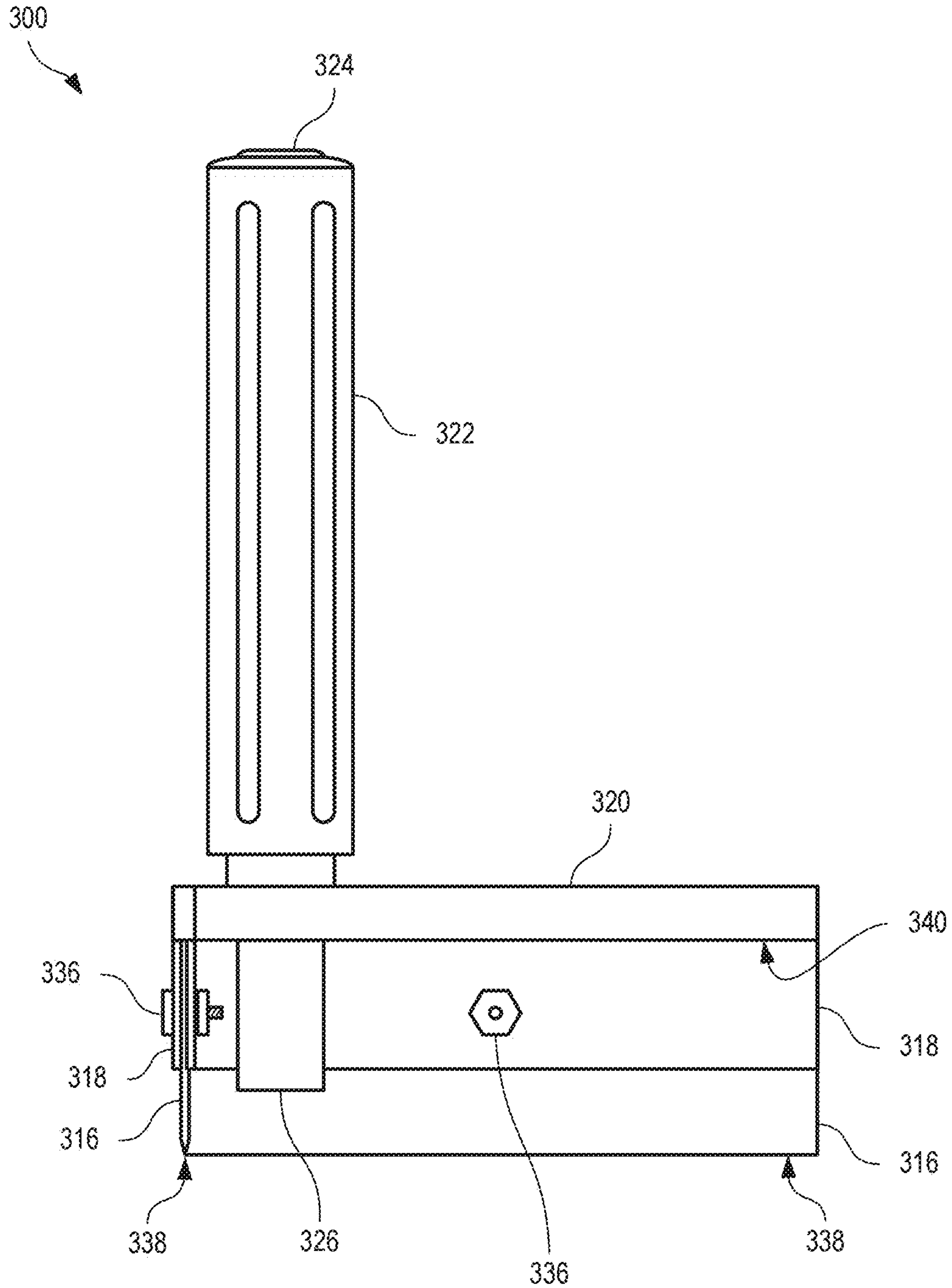
FIG. 3 is a side view of a chisel of a mortising kit according to certain aspects of the present disclosure.

FIG. 3 is a side view of a chisel 300 of a mortising kit according to certain aspects of the present disclosure. The chisel 300 can be chisel 104 of FIG. 1. The chisel 300 can include a blade 316 having a blade edge 338 for cutting into a subject material. The blade 316 can be secured to the chisel 300 using a blade holder 318. The blade holder 318 can include one or more pieces that secure the blade 316 to the main body of the chisel 300. The blade holder 318 can include one or more fasteners 336 (e.g., nuts and bolts) that can be used to tighten the blade holder 318 around the blade 316. Other techniques for removably securing a blade 316 to the chisel 300 can be used.

The chisel 300 can include a handle 322 with a handle end 324. The handle end 324 can include a flat surface for receiving force from an impact device, such as a hammer or other impact device. The chisel 300 can include a shoulder 320 having an engaging surface 340. The engaging surface 340 of the shoulder 320 can interact with stops of a guide to limit travel of the chisel 300 with respect to the guide, thus limiting travel of the chisel 300 with respect to the subject material to ensure cuts into the subject material are limited to a desired depth.

The chisel 300 can include a chisel locator feature 326. In some cases, a chisel 300 can include any number of chisel locator feature 326, such as two or more. The chisel locator feature 326 can be a protrusion or peg receivable by a guide locator feature of a guide. In some cases, however, the chisel locator feature 326 can be an aperture, a hold, a recess, or any other suitable feature for interacting with a guide locator feature and generating a slidable relationship between the chisel 300 and the guide.

In some cases, the chisel locator feature 326 can be parallel with the handle 322. In some case the chisel locator feature 326 can be collinear with the handle 322. In some cases, the chisel locator feature 326 and the handle 322 can be coupled together or monolithically made of a single piece. In some cases, the handle 322 can include an additional grip.

Figure 4:
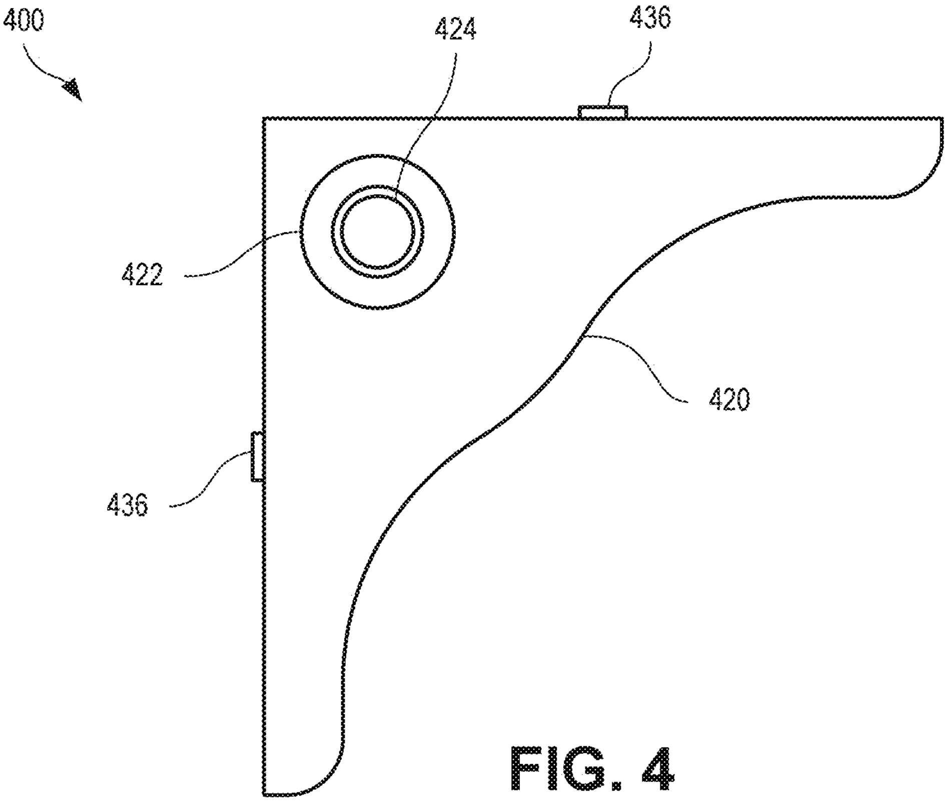
FIG. 4 is a top view of a chisel of a mortising kit according to certain aspects of the present disclosure.

FIG. 4 is a top view of a chisel 400 of a mortising kit according to certain aspects of the present disclosure. Chisel 400 can be chisel 104 of FIG. 1. The chisel 400 can include a handle 422 with a handle end 424. Fasteners 436 can be used to secure a blade to the chisel 400. The chisel 400 can include a shoulder 420.

Figure 5:
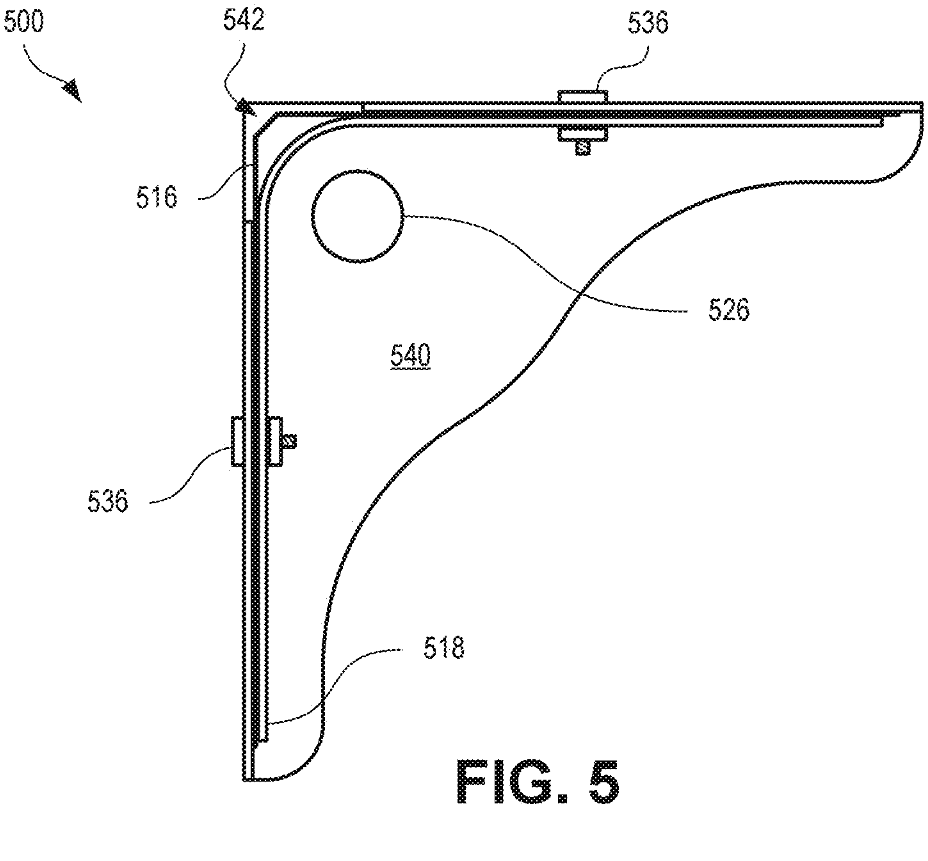
FIG. 5 is a bottom view of a chisel of a mortising kit having a chamfered corner according to certain aspects of the present disclosure

FIG. 5 is a bottom view of a chisel 500 of a mortising kit having a chamfered corner 542 according to certain aspects of the present disclosure. Chisel 500 can be chisel 104 of FIG. 1. The chisel 500 can include a chisel locator feature 526. Fasteners 536 and blade holder 518 can be used to secure a blade 516 to the chisel 500. The chisel 500 can include a shoulder 520. As depicted in FIG. 5, the shoulder 520 can extend between the ends of the blade 516, although the shoulder 520 can be otherwise shaped.

Blade 516 can include a chamfered corner 542. The chamfered corner 542 can form an overall 90° angle between opposing portions of the blade 516, although other degrees may be used. The blade 516 having a chamfered corner 542 can lead to the resultant mortise having a similar chamfered corner at its perimeter. A blade 516 having a chamfered corner 542 can be especially suitable for certain hinges or similar equipment that may have sharp corners or chamfered corners.

In some cases, the chisel 500 of FIG. 5 can be the same chisel depicted in FIGS. 6-9, however with different blades installed to replace blade 516.

Figure 6:
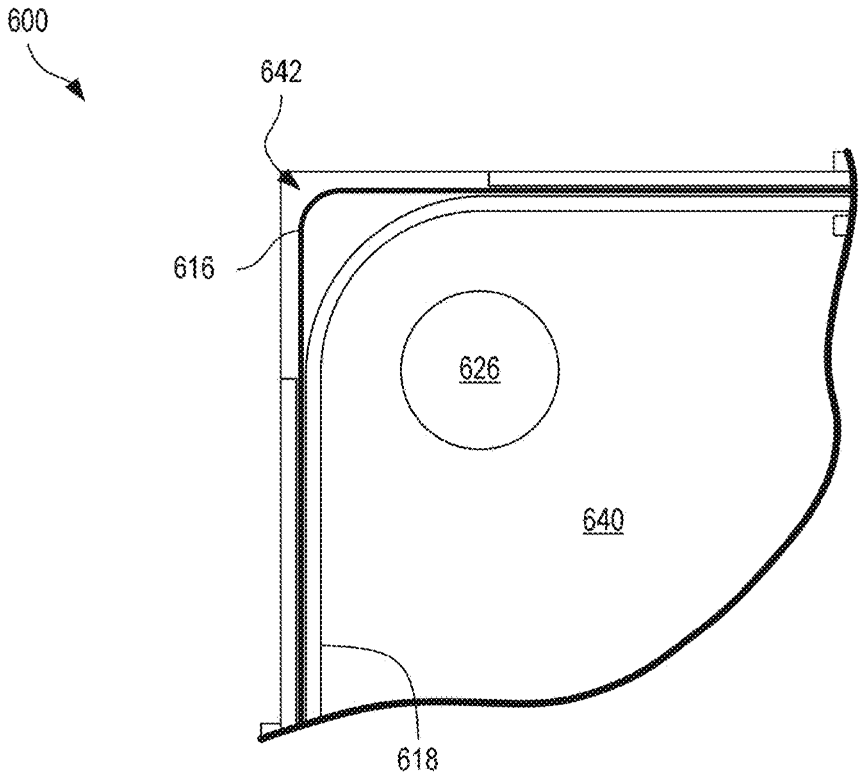
FIG. 6 is a bottom view of a chisel of a mortising kit having a small-radius fillet corner according to certain aspects of the present disclosure.

FIG. 6 is a bottom view of a chisel 600 of a mortising kit having a small-radius fillet corner according to certain aspects of the present disclosure. Chisel 600 can be chisel 104 of FIG. 1. The chisel 600 can include a chisel locator feature 626. Fasteners 636 and blade holder 618 can be used to secure a blade 616 to the chisel 600. The chisel 600 can include a shoulder 620. As depicted in FIG. 6, the shoulder 620 can extend between the ends of the blade 616, although the shoulder 620 can be otherwise shaped.

Blade 616 can include a fillet corner 642 having a small-radius fillet. The small-radius fillet can be any suitable size, such as a fillet having a radius at or smaller than ¼ inch. The fillet corner 642 can form an overall 90° angle between opposing portions of the blade 616, although other degrees may be used. The blade 616 having a small-radius fillet corner 642 can lead to the resultant mortise having a similar fillet corner at its perimeter. A blade 616 having a fillet corner 642 can be especially suitable for certain hinges or similar equipment that may have similarly-shaped corners.

Figure 7:
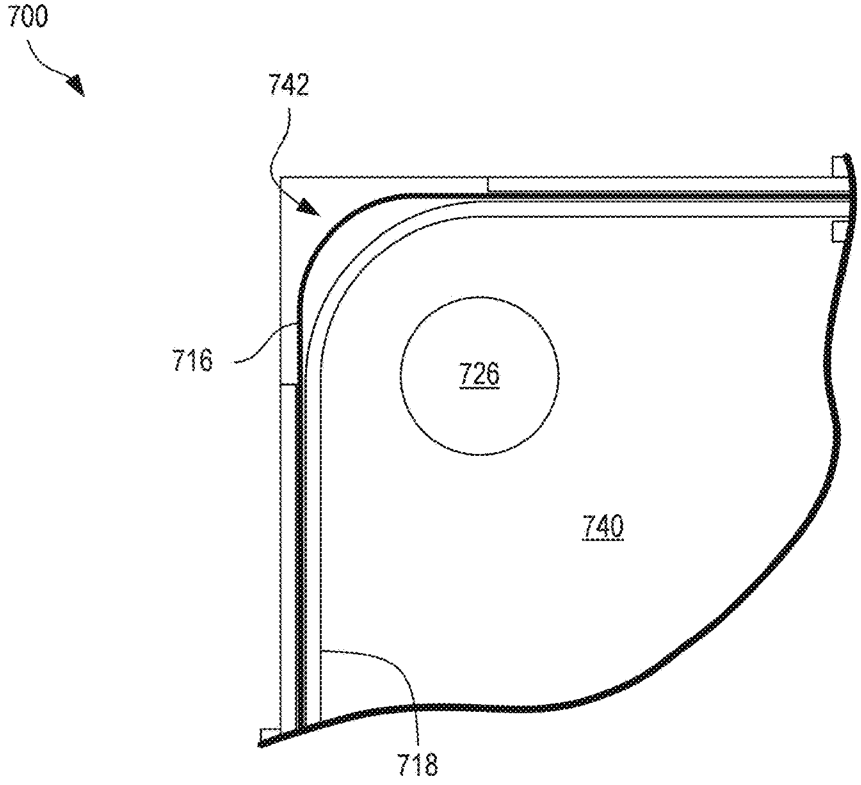
FIG. 7 is a bottom view of a chisel of a mortising kit having a medium-radius fillet corner according to certain aspects of the present disclosure.

FIG. 7 is a bottom view of a chisel 700 of a mortising kit having a medium-radius fillet corner according to certain aspects of the present disclosure. Chisel 700 can be chisel 104 of FIG. 1. The chisel 700 can include a chisel locator feature 726. Fasteners 736 and blade holder 718 can be used to secure a blade 716 to the chisel 700. The chisel 700 can include a shoulder 720. As depicted in FIG. 7, the shoulder 720 can extend between the ends of the blade 716, although the shoulder 720 can be otherwise shaped.

Blade 716 can include a fillet corner 742 having a medium-radius fillet. The medium-radius fillet can be any suitable size, such as a fillet having a radius between at or about ¼ inch and at or about ⅝ inch. The fillet corner 742 can form an overall 90° angle between opposing portions of the blade 716, although other degrees may be used. The blade 716 having a medium-radius fillet corner 742 can lead to the resultant mortise having a similar fillet corner at its perimeter. A blade 716 having a fillet corner 742 can be especially suitable for certain hinges or similar equipment that may have similarly-shaped corners.

Figure 8:
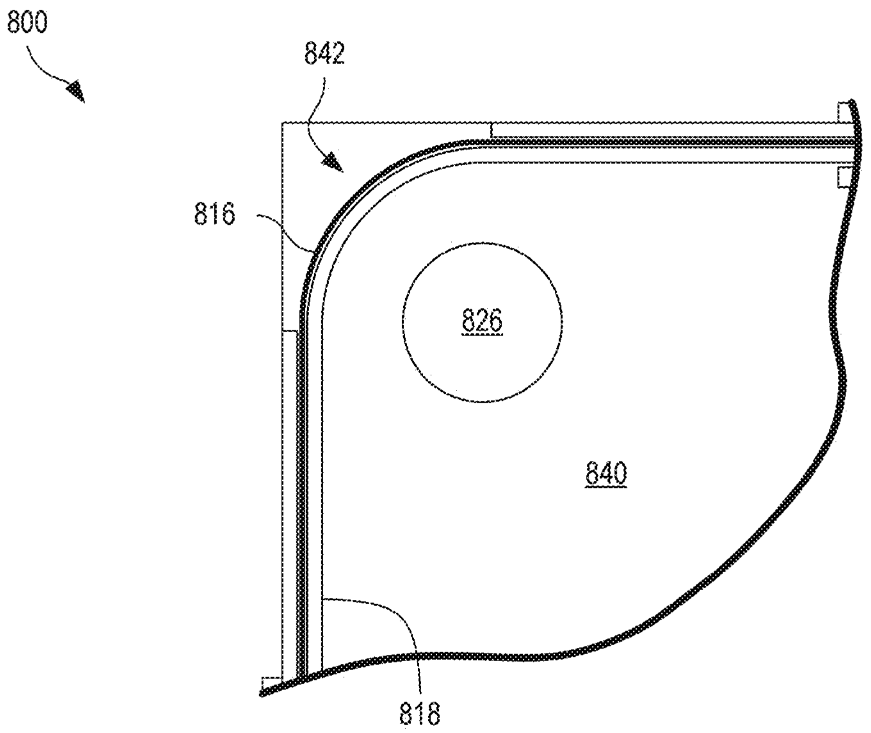
FIG. 8 is a bottom view of a chisel of a mortising kit having a large-radius fillet corner according to certain aspects of the present disclosure.

FIG. 8 is a bottom view of a chisel 800 of a mortising kit having a large-radius fillet corner according to certain aspects of the present disclosure. Chisel 800 can be chisel 104 of FIG. 1. The chisel 800 can include a chisel locator feature 826. Fasteners 836 and blade holder 818 can be used to secure a blade 816 to the chisel 800. The chisel 800 can include a shoulder 820. As depicted in FIG. 8, the shoulder 820 can extend between the ends of the blade 816, although the shoulder 820 can be otherwise shaped.

Blade 816 can include a fillet corner 842 having a large-radius fillet. The large-radius fillet can be any suitable size, such as a fillet having a radius at or larger than ⅝ inch. The fillet corner 842 can form an overall 90° angle between opposing portions of the blade 816, although other degrees may be used. The blade 816 having a large-radius fillet corner 842 can lead to the resultant mortise having a similar fillet corner at its perimeter. A blade 816 having a fillet corner 842 can be especially suitable for certain hinges or similar equipment that may have similarly-shaped corners.

Figure 9:
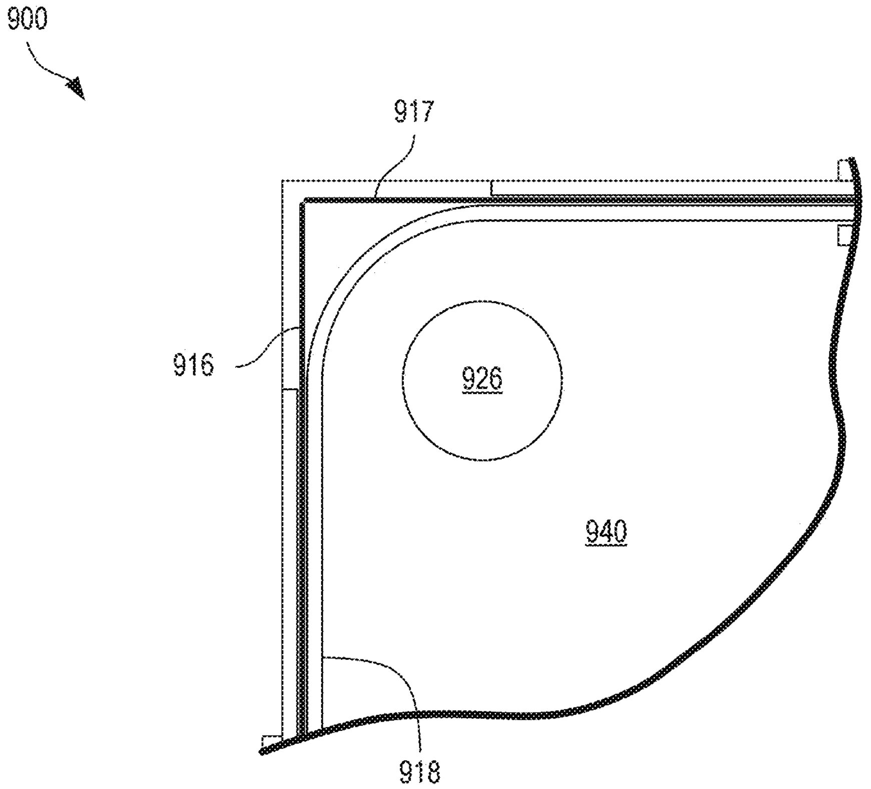
FIG. 9 is a bottom view of a dual-blade chisel of a mortising kit according to certain aspects of the present disclosure.

FIG. 9 is a bottom view of a dual-blade chisel 900 of a mortising kit according to certain aspects of the present disclosure. Chisel 900 can be chisel 104 of FIG. 1. The chisel 900 can include a chisel locator feature 926. Fasteners 936 and blade holder 918 can be used to secure blades 916, 917 to the chisel 900. The chisel 900 can include a shoulder 920. As depicted in FIG. 9, the shoulder 920 can extend between the non-meeting ends of blades 916, 917 although the shoulder 920 can be otherwise shaped.

The blade holder 918 can be used to secure blade 916 and blade 917 in a perpendicular orientation, although other orientations can be used. The blades 916, 917 can meet to form a corner. Blades 916, 917 can touch at the corner or can be spaced apart from one another. Despite not producing a contiguous cut in a subject material, the use of dual blades 916, 917 may nevertheless produce satisfactory cuts for a mortise perimeter in certain cases. The use of dual blades 916, 917 may be especially suitable for certain hinges or similar equipment that may have sharp corners (e.g., at or near 90°).

Figure 10:
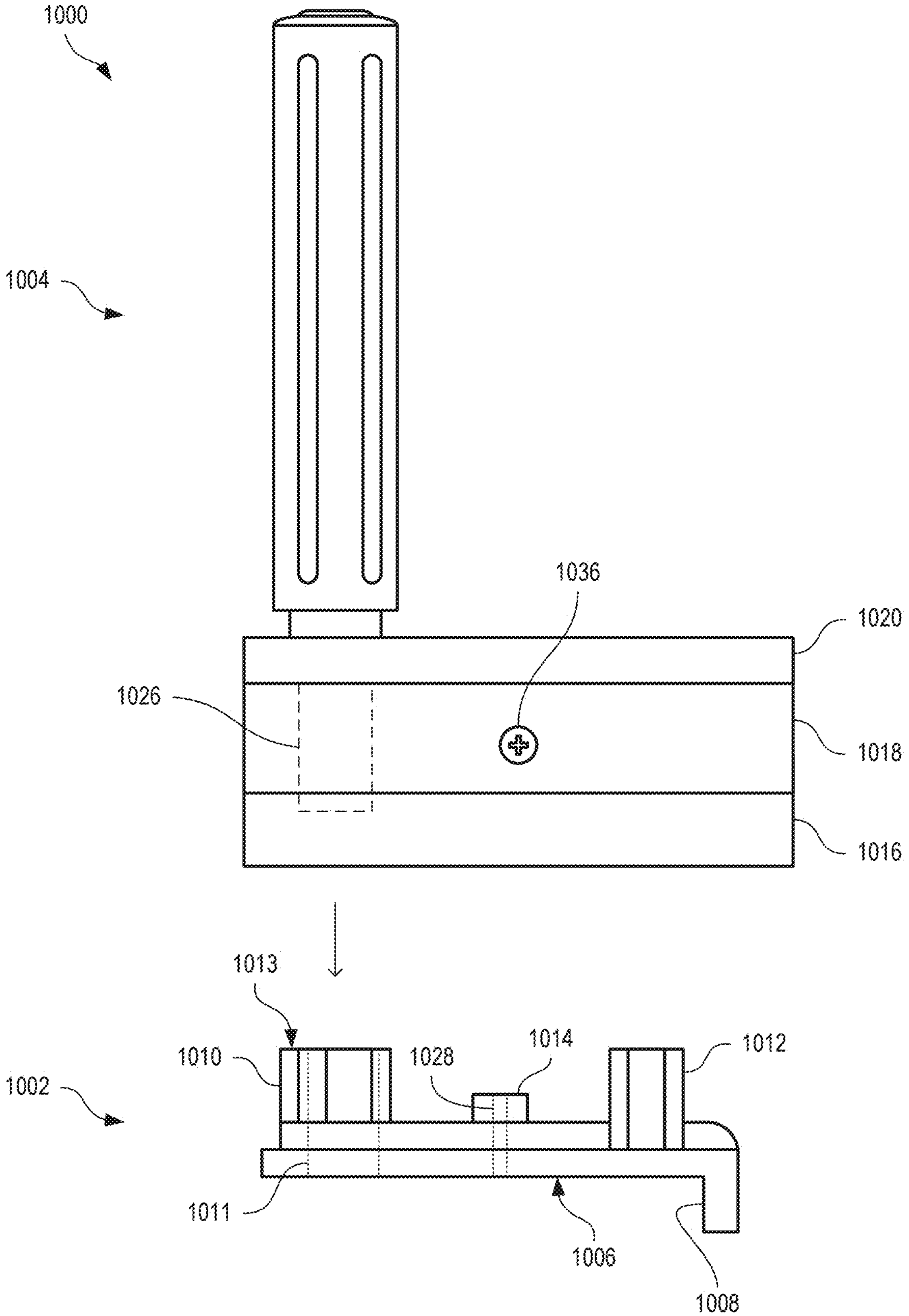
FIG. 10 is a front view of a mortising kit depicting placement of a chisel with respect to a guide according to certain aspects of the present disclosure.

FIG. 10 is a front view of a mortising kit 1000 depicting placement of a chisel 1004 with respect to a guide 1002 according to certain aspects of the present disclosure. The mortising kit 1000 can be mortising kit 100 of FIG. 1. The chisel 1004 can be seen in alignment with the guide 1002, wherein the chisel locator feature 1026 is aligned with the guide locator feature 1010. As depicted in FIG. 10, the chisel locator feature 1026 can be a protrusion having an outer circumference and the guide locator feature 1010 can be a hole or recess having an inner circumference 1011. In some cases, the chisel locator features 1026 and/or the guide locator feature 1010 can be cylindrical and/or conical in shape, although other shapes can be used. In some cases, the chisel locator features 1026 and/or the guide locator feature 1010 can be cylindrical and/or conical in shape with additional keyed features designed to limit rotation of the chisel locator feature 1026 within the guide locator feature 1010. The outer circumference of the chisel locator feature 1026 can be placed within the inner circumference 1011 of the guide locator feature 1010 to form a slidable relationship between the chisel 1004 and the guide 1002.

The chisel 1004 can include a blade holder 1018 and fastener 1036 for securing a blade 1016. Stops 1012 of the guide 1002 can interact with a shoulder 1020 of the chisel 1004 to limit travel of the blade 1016 to a specified distance past the bottom surface 1006 of the guide 1002. As depicted in FIG. 10, a distal surface 1013 of the guide locator feature 1010 can also function as a stop 1012 for engaging the shoulder 1020 of the chisel 1004. Further, the location of the guide locator feature 1010 with respect to the lip 1008 and the location of the chisel locator feature 1026 with respect to the blade 1016 can facilitate alignment of the blade 1016 with respect to the lip 1008, and therefore alignment of the blade 1016 with respect to the surface material against which the lip 1008 can be placed.

As seen in FIG. 10, the guide 1002 can include a securement feature 1014. The securement feature 1014 can include an aperture 1028 into which a fastener, such as a nail, screw, tack, or other such fastener, can be placed. The fastener can be placed through the aperture 1028 of the securement feature 1014 and extend past the bottom surface 1006 of the guide 1002 to engage the subject material underneath the guide 1002, thus securing the guide 1002 to the subject material. In some cases, a securement feature can include a protrusion extending from the bottom surface 1006 of the guide 1002 and into a subject material against which the guide 1002 is placed.

Figure 11:
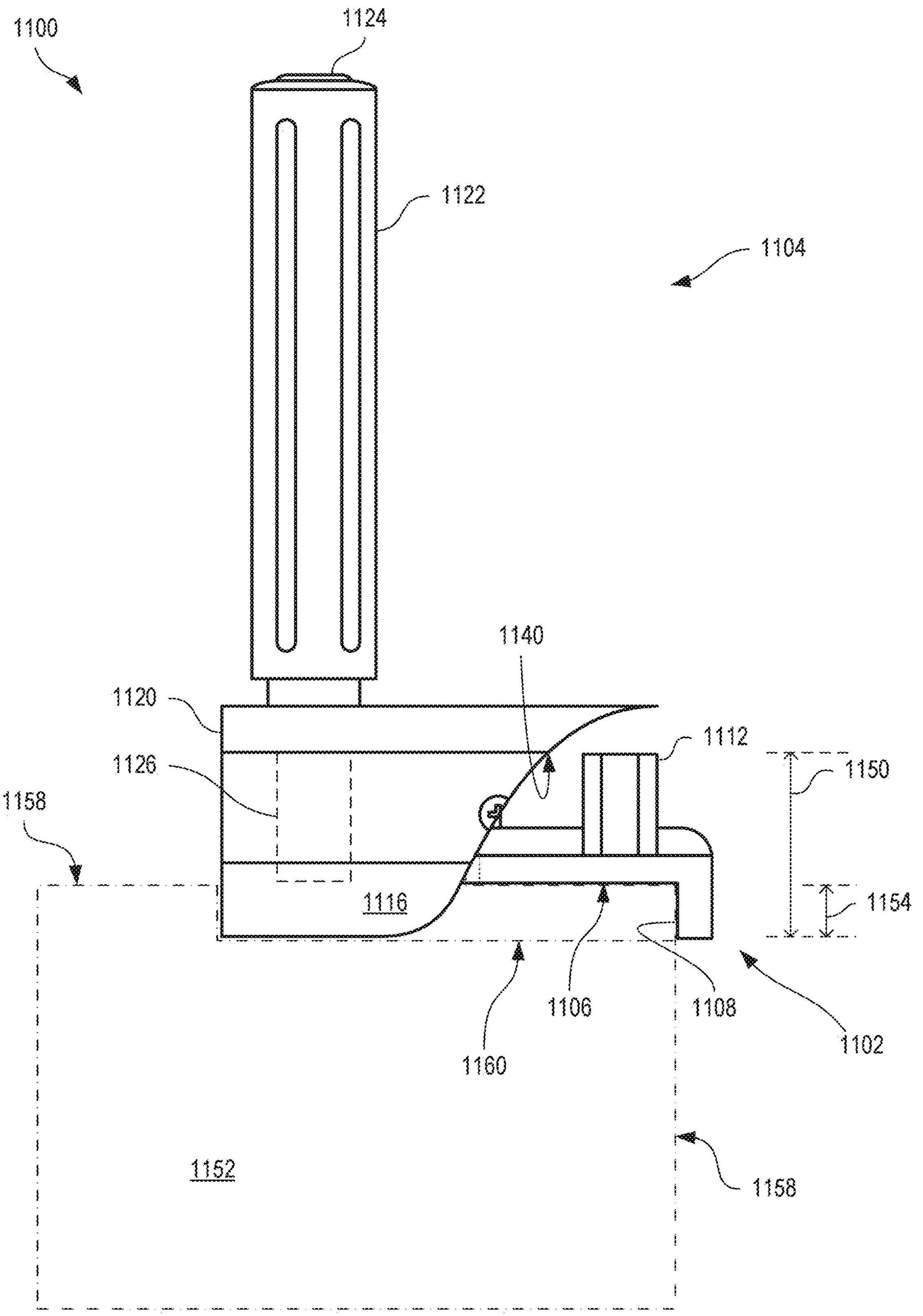
FIG. 11 is a partial-cutaway front view of a mortising kit depicting a chisel driven into a subject material to a stopping depth as set by a guide according to certain aspects of the present disclosure.

FIG. 11 is a partial-cutaway front view of a mortising kit 1100 depicting a chisel 1104 driven into a subject material 1152 to a stopping depth as set by a guide 1102 according to certain aspects of the present disclosure. The mortising kit 1100 can be mortising kit 110 of FIG. 1.

The guide 1102 is positioned against the subject material 1152, with the bottom surface 1106 of the guide 1102 resting against the side face 1158 of the subject material 1152 (e.g., side face of a door) and the lip 1108 of the guide 1102 resting against the front face 1156 of the subject material 1152 (e.g., front or back faces of a door).

The chisel 1104 is seen engaging guide 1102 and the subject material 1152, after receiving impact force at the handle end 1124 of the handle 1122 of the chisel 1104 to force the blade 1116 into the subject material 1152. The chisel locator feature 1126 is aligned with and interacting with the guide locator feature to ensure proper placement of the chisel 1104 with respect to the subject material 1152 (e.g., with respect to the front face 1156).

The cutaway view allows the stop 1112 to be seen, which has engaged the engagement surface 1140 of the shoulder 1120 to limit travel of the blade 1116 further into the subject material 1152. The depth 1154 of the resultant mortise perimeter cut 1160 can be set by the distance 1150 between the edge of the blade 1116 and the plane where the engagement surface 1140 of the shoulder 1120 meets the stop 1112. Thus, extending the distance between the edge of the blade 1116 and the engagement surface 1140 and/or decreasing the distance between the stop 1112 and the bottom surface 1106 of the guide 1102 can act to increase the depth 1154 of the mortise perimeter cut 1160. Likewise, decreasing the distance between the edge of the blade 1116 and the engagement surface 1140 and/or increasing the distance between the stop 1112 and the bottom surface 1106 of the guide 1102 can act to decrease the depth 1154 of the mortise perimeter cut 1160.

Figure 12:
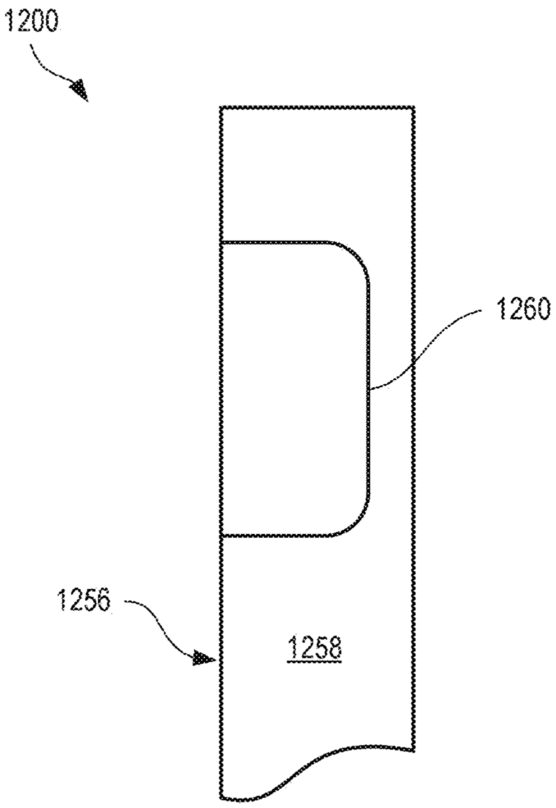
FIG. 12 is a side view depicting a door into which a mortise has been cut according to certain aspects of the present disclosure.

FIG. 12 is a side view depicting a door 1200 into which a mortise 1260 has been cut according to certain aspects of the present disclosure. The mortise 1260 can be the result of proper use of the mortising kit 100 of FIG. 1. The door 1200 can include a side face 1258 and a front face 1256. The mortise 1260 can extend from the front face 1256 and into the side face 1258 for a width that is smaller than the thickness of the door 1200. However, in some cases, a mortise can be spaced apart from the front face 1256 or can extend for a width that is a full thickness of the door 1200.

Figure 13:
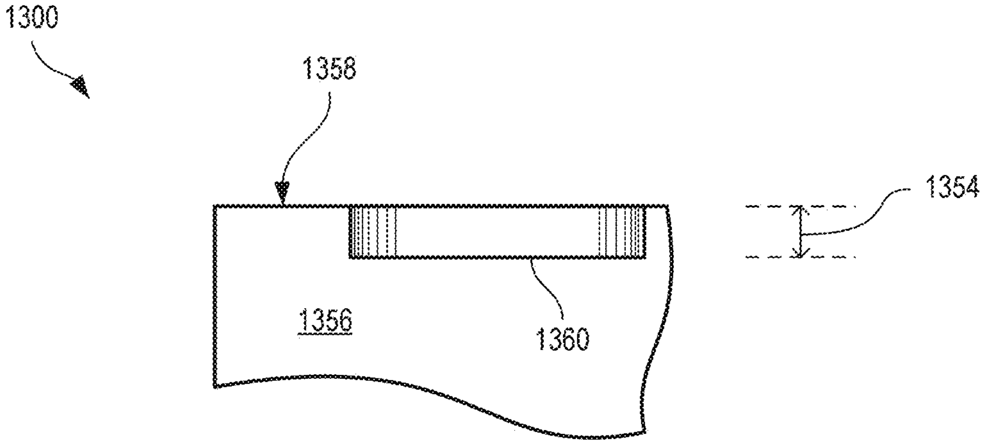
FIG. 13 is a front view depicting a door into which a mortise has been cut according to certain aspects of the present disclosure.

FIG. 13 is a front view depicting a door 1300 into which a mortise 1360 has been cut according to certain aspects of the present disclosure. The door 1300 and mortise 1360 can be door 1200 and mortise 1260 of FIG. 12. The door 1300 can include a side face 1358 and a front face 1356. The mortise 1360 can extend into the side face 1358 for a depth 1354 that is associated with the hinge or other equipment to be placed within the mortise 1360.

Figure 14:
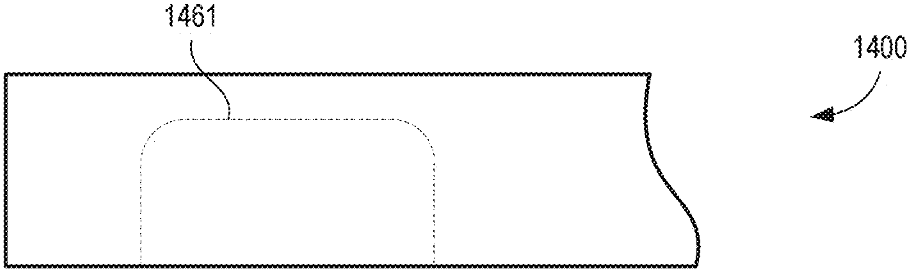
FIG. 14 is a side view depicting a mortise precursor position on a door according to certain aspects of the present disclosure.

FIG. 14 is a side view depicting a mortise precursor position 1461 on a door 1400 according to certain aspects of the present disclosure. The mortise precursor position 1461 can represent where a mortise is desired on the door 1400. Door 1400 is depicted prior to any mortise has been cut therein.

Figure 15:
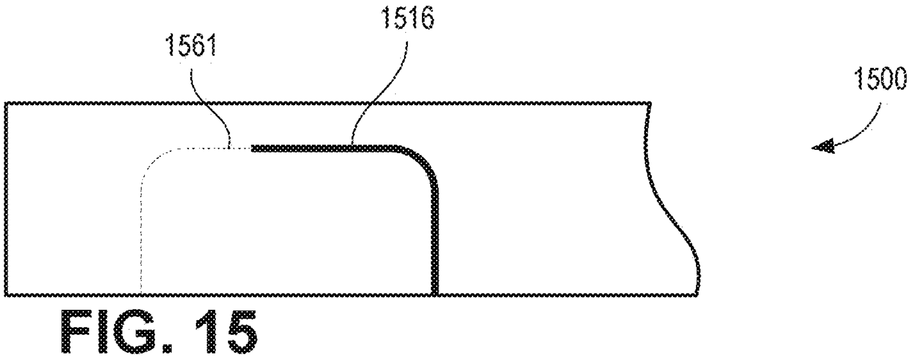
FIG. 15 is a side view of a door depicting a chisel blade positioned along a mortise precursor position according to certain aspects of the present disclosure.

FIG. 15 is a side view of a door 1500 depicting a chisel blade 1516 positioned along a mortise precursor position 1561 according to certain aspects of the present disclosure. Door 1500 can be door 1400 of FIG. 14 after placement of a chisel blade 1516 over at least a portion of the mortise precursor position 1561. Application of force to the chisel blade 1516 can initiate a mortise perimeter cut into the door 1500.

The chisel blade 1516 can be aligned with the mortise precursor position 1561 through use of a guide and locator features as described herein. The chisel blade 1516 can be part of a chisel of a mortising kit, such as mortising kit 100 of FIG. 1. Elements of the mortising kit other than the chisel blade 1516 are not depicted for illustrative purposes, although such other elements may be used to properly align the chisel blade 1516.

Figure 16:
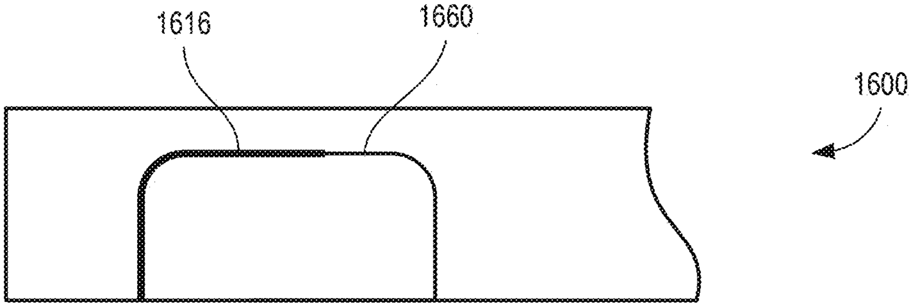
FIG. 16 is a side view of a door depicting a chisel blade positioned along a mortise precursor position and overlapping a first mortise cut according to certain aspects of the present disclosure.

FIG. 16 is a side view of a door 1600 depicting a chisel blade 1616 positioned along a mortise precursor position and overlapping a first mortise cut 1660 according to certain aspects of the present disclosure. Door 1600 can be door 1500 of FIG. 15 after placement of a chisel blade 1616 over at least a second portion of the mortise precursor position 1661 after a mortise perimeter cut 1660 has been made as depicted in FIG. 15. Application of force to the chisel blade 1616 can initiate a second mortise perimeter cut into the door 1600.

The chisel blade 1616 can be aligned with the mortise precursor position 1661 through use of a guide and locator features as described herein. The chisel blade 1616 can be part of a chisel of a mortising kit, such as mortising kit 100 of FIG. 1. Elements of the mortising kit other than the chisel blade 1616 are not depicted for illustrative purposes, although such other elements may be used to properly align the chisel blade 1616.

Figure 17:
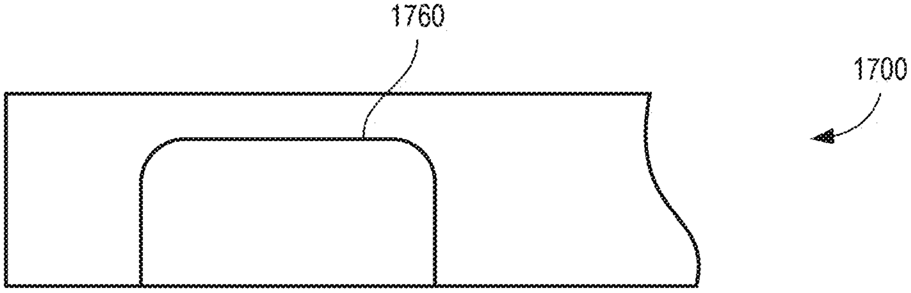
FIG. 17 is a side view of a door depicting a mortise perimeter as cut using a chisel blade positioned as depicted in FIGS. 15 and 16 according to certain aspects of the present disclosure.

FIG. 17 is a side view of a door 1700 depicting a mortise perimeter 1760 as cut using a chisel blade positioned as depicted in FIGS. 15 and 16 according to certain aspects of the present disclosure. Door 1700 can be door 1600 of FIG. 16 after first and second mortise perimeter cuts have been made as depicted in FIGS. 15 and 16 to create a full mortise perimeter cut 1760. The full mortise perimeter cut 1760 can establish an outer perimeter and a depth of the final mortise.

Figure 18:
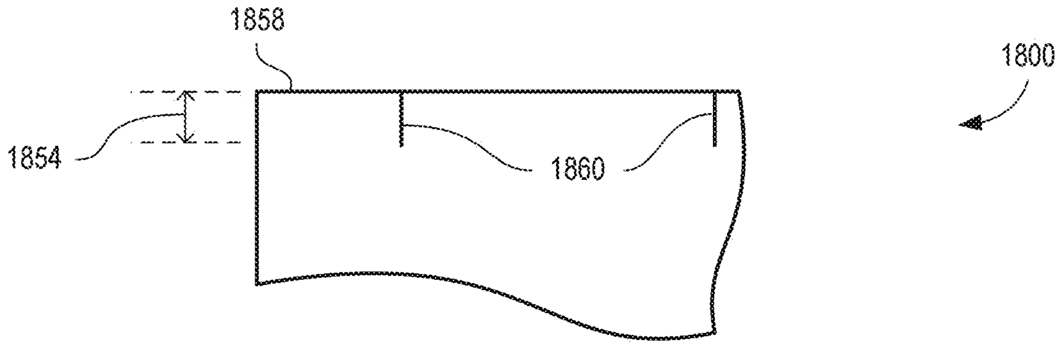
FIG. 18 is a front view depicting a mortise perimeter cut in a door according to certain aspects of the present disclosure.

FIG. 18 is a front view depicting a mortise perimeter cut 1860 in a door 1800 according to certain aspects of the present disclosure. The mortise perimeter cut 1860 can be mortise perimeter cut 1760. The mortise perimeter cut 1860 can establish the depth 1854 of the resultant mortise into a side face 1858 of the door 1800.

Figure 19:
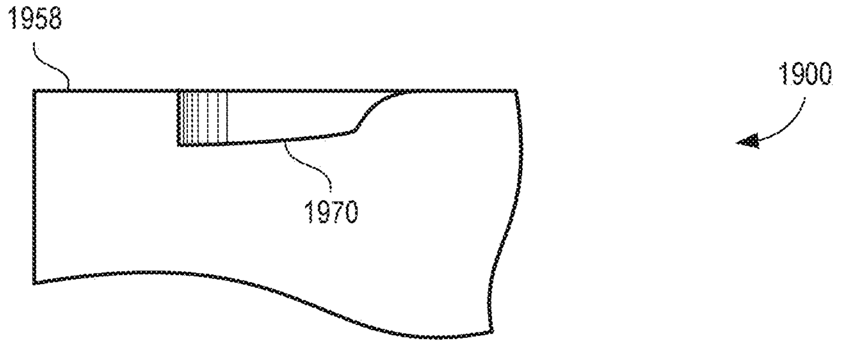
FIG. 19 is a front view depicting a partial mortise cut into a door according to certain aspects of the present disclosure.

FIG. 19 is a front view depicting a partial mortise 1970 cut into a door 1900 according to certain aspects of the present disclosure. Door 1900 can be door 1800 of FIG. 18 after a portion of the subject material has been removed from within the mortise perimeter cut 1860, resulting in a partial mortise 1970.

Figure 20:
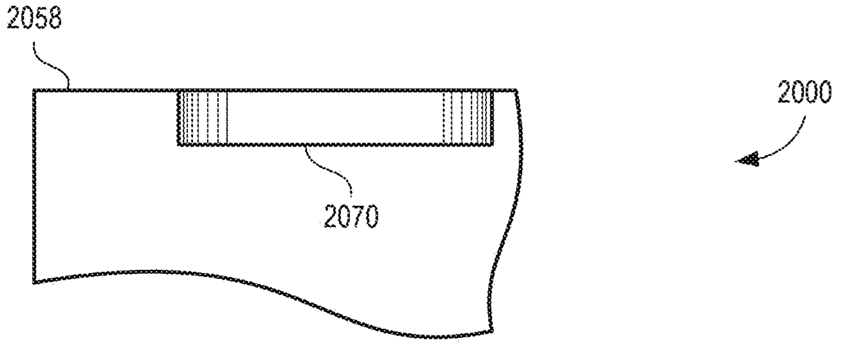
FIG. 20 is a front view depicting a mortise cut into a door according to certain aspects of the present disclosure.

FIG. 20 is a front view depicting a mortise 2070 cut into a door 2000 according to certain aspects of the present disclosure. Door 2000 can be door 1900 of FIG. 19 after the remainder of the subject material has been removed from within the mortise perimeter cut, resulting in mortise 2070.

Figure 21:
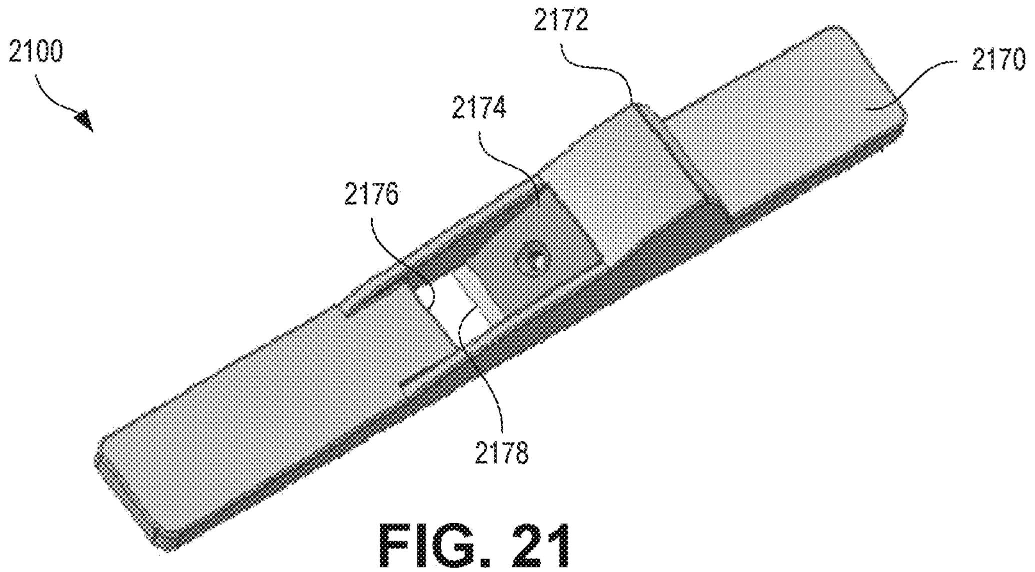
FIG. 21 is a axonometric view depicting the top of a block plane according to certain aspects of the present disclosure.

FIG. 21 is a axonometric view depicting the top of a block plane 2100 according to certain aspects of the present disclosure. The block plane 2100 can include a body 2170 having a handle 2172, a blade holder 2174, and a window 2176. The blade holder 2174 can support a blade 2178 through the window 2176 such that the blade 2178 protrudes below a bottom surface of the block plane 2100.

In some cases, blade 2178 can extend for approximately the full width of the window 2176. The window 2176 can provide a large opening through which the subject material being planed can be readily viewed. The window 2176 can present an opening that is at least as wide as the blade 2178 and at least as long as 20%, 25%, 30%, 35%, 40%, 45%, 50%, 55%, 60%, 65%, 70%, 75%, 80%, 85%, 90%, 95%, or 100% of the width of the blade 2178.

The large opening can be especially suitable for cutting mortises from mortise perimeter cuts that have been prepared according to certain aspects of the present disclosure. In some cases, a mortising kit, such as mortising kit 100 of FIG. 1, can further include a block plane 2100.

Figure 22:
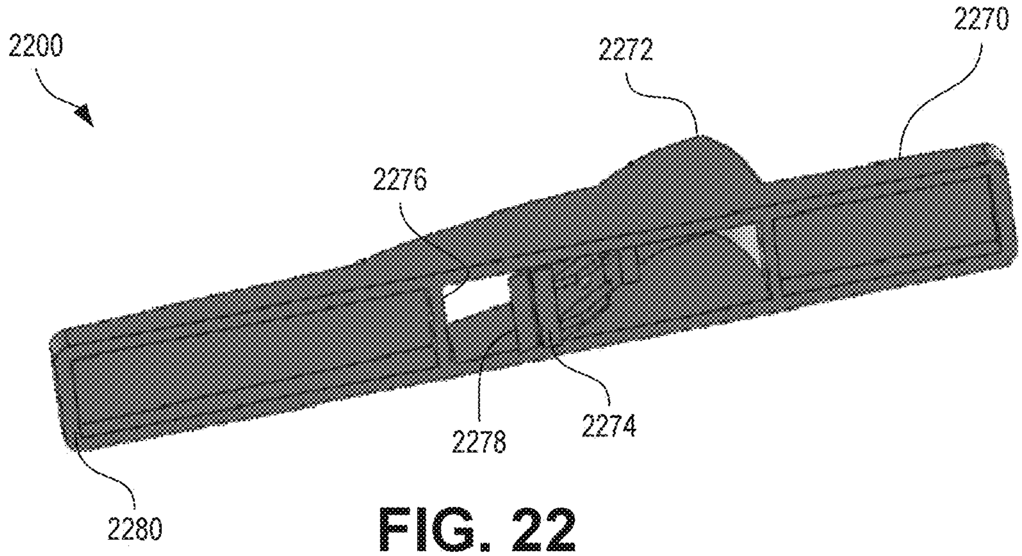
FIG. 22 is a axonometric view depicting the bottom of a block plane according to certain aspects of the present disclosure.

FIG. 22 is a axonometric view depicting the bottom of a block plane 2200 according to certain aspects of the present disclosure. Block plane 2200 can be block plane 2100 of FIG. 21. The block plane 2200 can include a body 2270 having a handle 2272, a blade holder 2274, and a window 2276. The blade holder 2274 can support a blade 2278 through the window 2276 such that the blade 2278 protrudes below a bottom surface 2280 of the block plane 2200.

Figure 23:
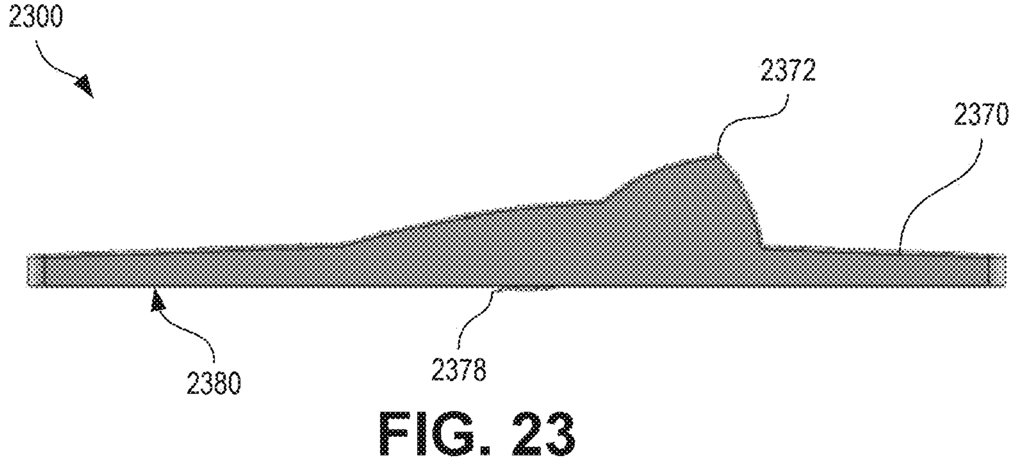
FIG. 23 is a side view of a block plane according to certain aspects of the present disclosure.

FIG. 23 is a side view of a block plane 2300 according to certain aspects of the present disclosure. Block plane 2300 can be block plane 2100 of FIG. 21. The block plane 2300 can include a body 2370 having a handle 2372, a blade holder, and a window. The blade holder can support a blade 2378 through the window such that the blade 2378 protrudes below a bottom surface 2380 of the block plane 2300.

Figure 24:
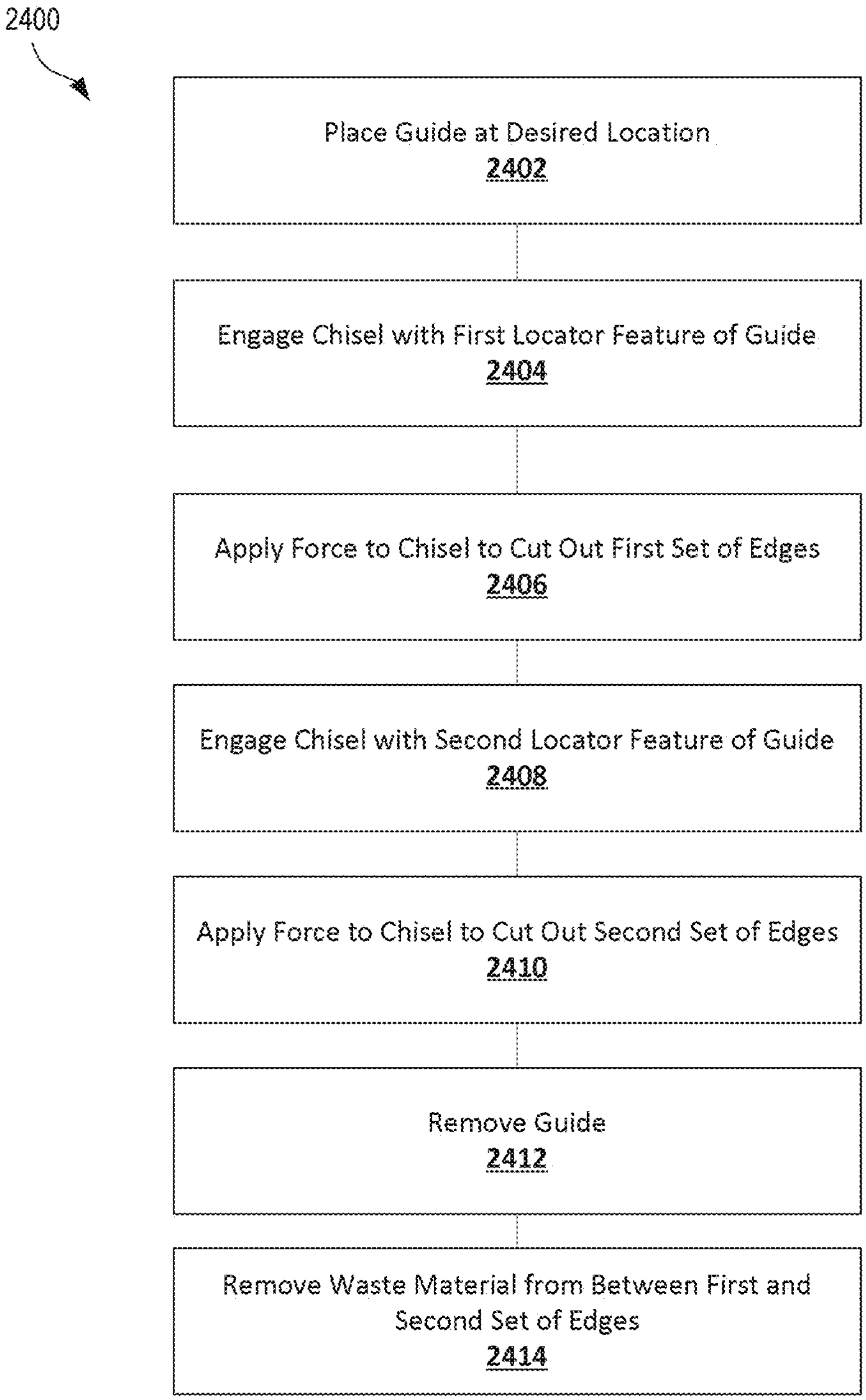
FIG. 24 is a flowchart depicting a process for cutting a mortise into a subject material according to certain aspects of the present disclosure.

FIG. 24 is a flowchart depicting a process 2400 for cutting a mortise into a subject material according to certain aspects of the present disclosure. At block 2402, the guide can be placed at a desired location. Placement of the guide can include placing a bottom surface of the guide against a surface of a subject material to be mortised and optionally aligning a lip of the guide with an additional surface (e.g., an additional surface perpendicular to the surface against which the bottom surface of the guide is placed) of the subject material. In some cases, placement of the guide can also include removably attaching the guide to the subject material, such as through the use of fasteners (e.g., nails, screws, etc.).

At block 2404, the chisel is placed in a first locator feature of the guide. Placing the chisel in the first locator feature can include aligning and engaging a chisel locator feature with a guide locator feature. Aligning and engaging a chisel locator feature with a guide locator feature can include placing one of the chisel locator feature and the guide locator feature into the other. Engagement of a chisel locator feature with a guide locator feature can establish a sliding relationship with the chisel and the guide such that the blades of the chisel travel along a predictable and repeatable path with respect to the guide and into the subject material.

At block 2406, force is applied to the chisel to cut out a first set of edges. The first set of edges correspond to where the blade(s) of the chisel engage the subject material. The engagement of the chisel with the first locator feature of the guide at block 2404 can ensure the first set of edges are cut at the appropriate location.

At block 2408, the chisel can be placed in a second locator feature of the guide. In some cases, instead of placing the chisel in a second locator feature, the chisel can be placed in the first locator feature, however in a different orientation (e.g., 90° offset) that the placement at block 2404. In some cases, placing the chisel in the second locator feature can include aligning and engaging the chisel locator feature with a second guide locator feature. Engagement of a chisel locator feature with a guide locator feature at block 2408 can establish a sliding relationship with the chisel and the guide such that the blades of the chisel travel along a second predictable and repeatable path with respect to the guide and into the subject material. This second path can be different than the first path of block 2404. This second path can partially intersect and/or overlap the first path of block 2404.

At block 2410, force is applied to the chisel to cut out a second set of edges. The second set of edges correspond to where the blade(s) of the chisel engage the subject material when positioned according to block 2408. The engagement of the chisel with the locator feature of the guide at block 2408 can ensure the second set of edges are cut at the appropriate location relative to the first set of edges.

At block 2412, the guide can be removed from the subject material. At block 2414, waste material (e.g., waste wood or other material) can be removed from the subject material from between the first and second set of edges. In some cases, the first and second set of edges define a contiguous or non-contiguous mortise perimeter. The waste material removed at block 2414 can be the waste material located within the mortise perimeter. Waste material removed at block 2414 can be removed down to the depth of the first and second set of edges.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a mortising kit, comprising: a chisel having a blade for cutting mortise perimeter cuts into a substrate, the chisel including a chisel locator feature; and a guide positionable on the substrate at a mortise location and having one or more edges defining a perimeter, the guide having at least one guide locator feature for interacting with the chisel locator feature to establish a slidable relationship between the guide and the chisel, wherein the slidable relationship maintains the blade of the chisel on a path perpendicular to and spaced apart from the perimeter of the guide.

Example 2 is the mortising kit of example 1, wherein the guide includes at least one additional locator feature for receiving the chisel locator feature to establish an additional slidable relationship between the guide and the chisel, wherein the additional slidable relationship maintains the blade of the chisel on an additional path perpendicular to and spaced apart from the perimeter of the guide, and wherein the additional path is spaced apart from the path such that force applied to the chisel when in the slidable relationship results in first mortise perimeter cuts in the substrate and force applied to the chisel when in the additional slidable relationship results in second mortise perimeter cuts in the substrate that partially intersect the first mortise perimeter cuts, and wherein the first mortise perimeter cuts and the second mortise perimeter cuts define a mortise perimeter.

Example 3 is the kit of examples 1 or 2, wherein the chisel includes a shoulder interactable with one or more end surfaces of the one or more guide locator features when in the slidable relationship to limit travel of the blade.

Example 4 is the kit of examples 1-3, wherein the chisel includes a shoulder, and wherein the guide includes one or more stops interactable with shoulder of the chisel to limit travel of the blade when the chisel and the guide are in the slidable relationship.

Example 5 is the kit of examples 1-4, wherein the chisel includes a blade holder for removably securing the blade.

Example 6 is the kit of examples 1-5, further comprising at least one additional blade exchangeable with the blade, wherein the blade is shaped to produce mortise perimeter cuts associated with a first mortise shape, and wherein the at least one additional blade is shaped to produce mortise perimeter cuts associated with one or more additional mortise shapes that differ from the first mortise shape.

Example 7 is the kit of examples 1-6, wherein the chisel locator feature and the at least one guide locator feature includes a protrusion, wherein another of the chisel locator feature and the at least one guide locator feature includes an aperture, wherein the protrusion and the aperture establish the slidable relationship when the chisel locator feature and the guide locator feature interact.

Example 8 is a mortising kit, comprising: a chisel locator feature positionable on a chisel having a blade and at a distance spaced apart from the blade; and a guide locator feature positionable on a guide having a perimeter and at a distance spaced apart from the perimeter, wherein the blade is confined to a path perpendicular to and spaced apart from the perimeter when the chisel locator feature interacts with the guide locator feature.

Example 9 is the mortising kit of example 8, further comprising an additional guide locator feature positionable on the guide such that the blade is confined to an additional path perpendicular to and spaced apart from the perimeter when the chisel locator feature interacts with the additional guide locator feature, wherein force applied to the chisel results in a first mortise perimeter cut when the chisel locator feature interacts with the guide locator feature, wherein force applied to the chisel results in a second mortise perimeter cut when the chisel locator feature interacts with the additional guide locator feature, wherein the first mortise perimeter cut and second mortise perimeter cut partially intersect to define a mortise perimeter.

Example 10 is the kit of examples 8 or 9, further comprising a shoulder positionable on the chisel and interactable with an end surface of the guide locator feature to limit travel of the blade when the chisel locator feature interacts with the guide locator feature.

Example 11 is the kit of examples 8-10, further comprising: a chisel shoulder positionable on the chisel; and a stop positionable on the guide and interactable with the chisel shoulder to limit travel of the blade when the chisel locator feature interacts with the guide locator feature.

Example 12 is the kit of examples 8-11, wherein the chisel includes a blade holder for removably securing the blade.

Example 13 is the kit of examples 8-12, further comprising an additional blade exchangeable with the blade, wherein the blade is shaped to produce mortise perimeter cuts associated with a first mortise shape, and wherein the additional blade is shaped to produce mortise perimeter cuts associated with a second mortise shape that differs from the first mortise shape.

Example 14 is the kit of examples 8-13, wherein one of the chisel locator feature and the guide locator feature includes a protrusion, wherein another of the chisel locator feature and the guide locator feature includes an aperture, wherein the protrusion and the aperture establish a slidable relationship when the chisel locator feature and the guide locator feature interact.

Example 15 is a method, comprising: positioning a guide on a substrate material, the guide including a guide locator feature; aligning a chisel locator feature of a chisel with the guide locator feature of the guide; manipulating the chisel to induce interaction between the guide locator feature and the chisel locator feature and place a blade of the chisel against a surface of the substrate material; and applying force to the chisel to push the blade into the substrate material and generate a mortise perimeter cut.

Example 16 is the method of example 15, further comprising: removing the chisel by separating the chisel locator feature and the guide locator feature; aligning the chisel locator feature with an additional guide locator feature of the guide; manipulating the chisel to induce interaction between the additional guide locator feature and the chisel locator feature and place the blade of the chisel against the surface of the substrate material; and applying force to the chisel to push the blade into the substrate material and generate an additional mortise perimeter cut, wherein the mortise perimeter cut and the additional mortise perimeter cut partially intersect to define a mortise perimeter.

Example 17 is the method of example 16, further comprising: applying block plane to remove material from the substrate material within the mortise perimeter.

Example 18 is the method of examples 15-17, wherein applying force to the chisel includes applying sufficient force to cause a shoulder of the chisel to interact with an end surface of the guide locator feature to limit travel of the blade into the substrate material.

Example 19 is the method of examples 15-18, wherein applying force to the chisel includes applying sufficient force to cause a shoulder of the chisel to interact with a stop of the guide to limit travel of the blade into the substrate material.

Example 20 is the method of examples 15-19, wherein aligning the chisel locator feature with the guide locator feature includes aligning a protrusion with an aperture, wherein the protrusion and the aperture establish a slidable relationship when the chisel locator feature and the guide locator feature interact.

What is claimed is:

1. A guide assembly for use with a chisel for cutting mortise perimeter cuts into a substrate, comprising:
- a guide having an outer perimeter, wherein the guide is positionable on the substrate at a location for installing a hinge, the guide including:
  - a surface for placement on the substrate;
  - a lip oriented to be placed against a front surface of the substrate to position the guide; and
  - at least one guide locator feature configured to interact with a chisel locator feature on the chisel to couple the guide and the chisel, wherein coupling the guide and the chisel maintains a blade of the chisel on a cutting path as defined by the outer perimeter of the guide.

2. The guide assembly of claim 1, wherein the guide further comprises at least one securement feature configured to secure the guide to the substrate.

3. The guide assembly of claim 2, wherein the at least one securement feature is oriented to receive a fastener to engage the substrate underneath the surface of the guide.

4. The guide assembly of claim 1, wherein the coupling of the guide and the chisel allows the chisel to move perpendicularly to the guide.

5. The guide assembly of claim 1, wherein the at least one guide locator feature is shaped to limit rotational movement of the chisel locator feature within the at least one guide locator feature when the guide and chisel are coupled.

6. A method, comprising:
- positioning a guide on a substrate for installing a hinge, wherein the guide includes:
  - an outer perimeter;
  - a surface for placement on the substrate; and
  - at least one guide locator feature configured to interact with a chisel locator feature on a chisel to couple the guide and the chisel;
- orienting a lip of the guide to be placed against a front surface of the substrate;
- coupling the guide and the chisel to maintain a blade of the chisel on a cutting path as defined by the outer perimeter of the guide; and
- applying force to the chisel to generate a cut on the cutting path to install the hinge.

7. The method of claim 6, wherein the guide further comprises at least one securement feature.

8. The method of claim 7, wherein positioning the guide on the substrate further comprises securing the guide to the substrate using the at least one securement feature.

9. The method of claim 7, wherein positioning the guide on the substrate further comprises the at least one securement feature receiving a fastener to engage the substrate underneath the surface of the guide.

10. The method of claim 6, wherein the coupling of the guide and the chisel allows the chisel to move perpendicularly to the guide.

11. The method of claim 6, wherein the coupling of the guide and the chisel limits rotational movement of the chisel locator feature within the at least one guide locator feature.

12. A mortising kit, comprising:
- a chisel having a blade for cutting mortise perimeter cuts into a substrate, the chisel including a chisel locator feature; and
- a guide having an outer perimeter, wherein the guide is positionable on the substrate at a location for installing a hinge, the guide including at least one guide locator feature configured to interact with the chisel locator feature on the chisel to couple the guide and the chisel and a lip oriented to be placed against a front surface of the substrate to position the guide, wherein coupling the guide and the chisel maintains a blade of the chisel on a cutting path as defined by the outer perimeter of the guide.

13. The mortising kit of claim 12, wherein the guide further includes a surface for placement on the substrate.

14. The mortising kit of claim 13, wherein the guide further comprises at least one securement feature configured to secure the guide to the substrate.

15. The mortising kit of claim 14, wherein the at least one securement feature is oriented to receive a fastener to engage the substrate underneath the surface of the guide.

16. The mortising kit of claim 12, wherein the coupling of the guide and the chisel allows the chisel to move perpendicularly to the guide.

17. The mortising kit of claim 12, wherein the at least one guide locator feature is shaped to limit rotational movement of the chisel locator feature within the at least one guide locator feature when the guide and chisel are coupled.

* * * * *